Feb. 1, 1966 W. C. FORK ETAL 3,232,160
SELF-LOCKING PIN
Original Filed March 2, 1961
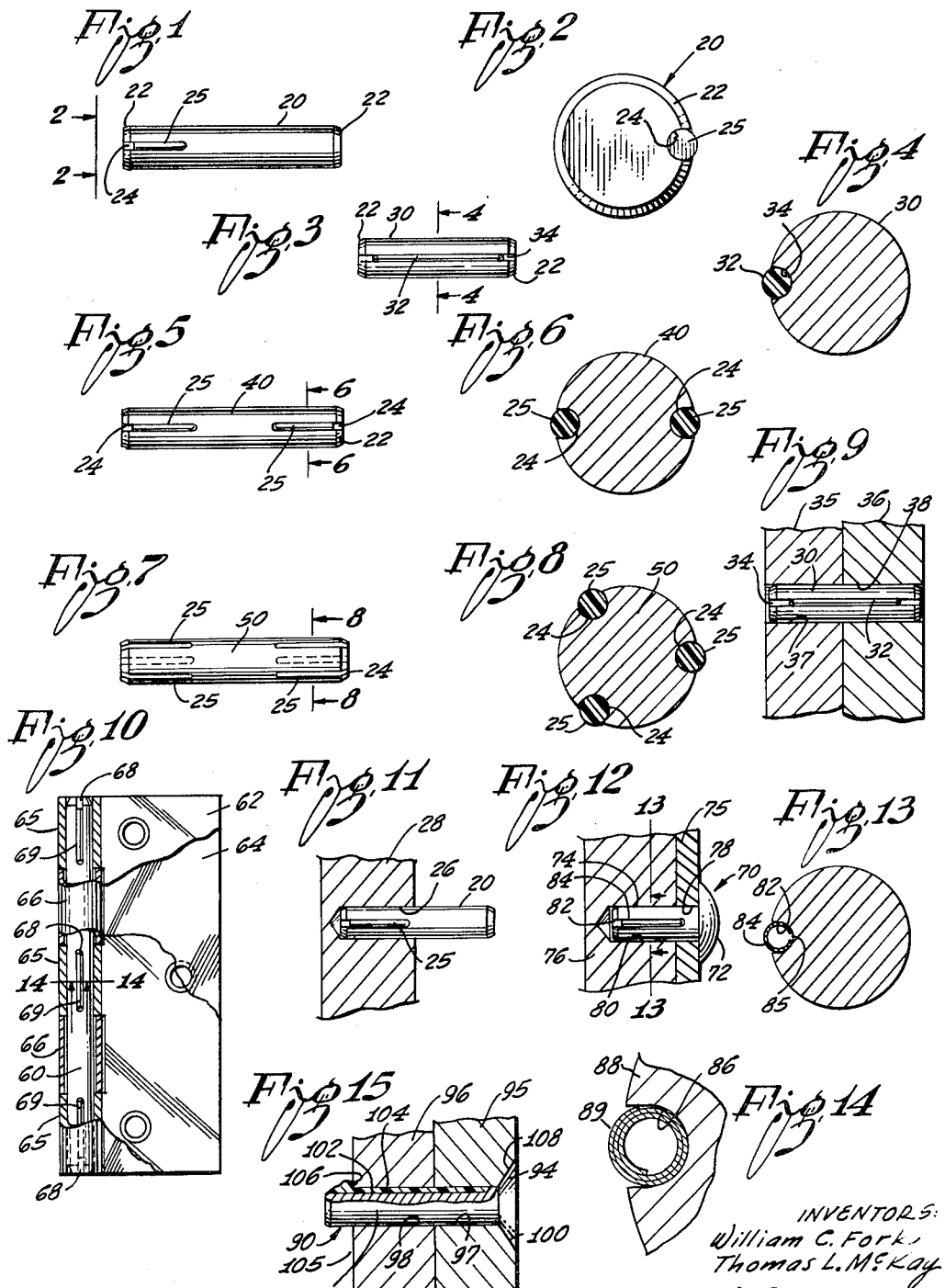
INVENTORS:
William C. Fork,
Thomas L. McKay
By Smyth, Roston & Pavitt
Attorneys United States Patent Office 3,232,160
Patented Feb. 1, 1966

3,232,160
SELF-LOCKING PIN
William C. Fork, Woodland Hills, and Thomas L. McKay, Los Angeles, Calif., assignors to Long-Lok Corporation, Los Angeles, Calif., a corporation of California
Continuation of application Ser. No. 92,812, Mar. 2, 1961. This application Sept. 9, 1964, Ser. No. 396,802
2 Claims. (Cl. 85—8.3)

This is a continuation of application Serial No. 92,812 filed March 2, 1961, by William C. Fork and Thomas L. McKay for "Self-Locking Pin" which is now abandoned.

This invention relates to a pin for insertion into a bore in a self-locking manner. The pin may, for example, be designed for use as a dowel, or may be designed for use as a hinge pin, or may be designed to serve as a fastening means to hold two members together.

The basic concept of the invention is the forming of a pin with longitudinal peripheral groove and the seating of a resiliently deformable insert within the groove with the insert extending initially radially outwardly of the pin beyond the periphery of the pin. The combined width of the pin and the laterally protruding insert is greater than the diameter of the bore into which the pin is to be inserted.

Forcing the oversized pin assembly into the bore resiliently compresses the insert against the pin to create frictional resistance which locks the pin in the bore. Frictional locking action is created between the insert itself and the adjacent wall of the bore and additional frictional action is created by the reaction thrust of the insert against the pin causing pressure between the pin and the bore in the region that is diametrically opposite from the insert.

The insert may be any resiliently deformable construction. For use in a high temperature environment, the insert may be a resiliently deformable, hollow, thin-walled metal member. Thus the insert may be a metal tube and the tube may be longitudinally split. Or, again, the insert may be a rolled or coiled sheet of metal. If the insert is not to be used in a high temperature environment, it may be made advantageously of a suitable plastic such as nylon.

A feature of one form of the invention is the use of a plastic material having plastic memory. Such a pin is used in the aligned bores of two members to hold the two members together with a portion of the insert at the leading end of the pin extending beyond the outer side of one of the two members. When the pin is inserted into the two aligned bores the leading end of the insert is initially compressed against the pin as the leading end of the insert passes through the two bores. Then, with the leading end of the insert released from compression, it expands laterally to its original configuration and thus forms a shoulder in locking engagement with the outer side of the corresponding member. Such a pin may be in the form of a headed pin so that the head of the pin forms a second shoulder in locking engagement with the other of the two members. Thus the two shoulders cooperate to hold the two members together.

The insert may be anchored in the groove in various practices of the invention. Thus a plastic insert may be anchored by suitable cement or a metal insert may be brazed in place. In the selected practices of the invention, however, the insert in its unrestrained state is slightly oversized relative to the width of the groove so that when the insert is forced into the groove the insert is slightly compressed transversely and is effectively anchored against withdrawal by frictional engagement with the opposite side walls of the groove.

The features and advantages of the invention may be understood by reference to the following detailed description and the accompanying drawing.

In the drawing, which is to be regarded as merely illustrative:

FIG. 1 is a side elevation of a pin assembly in which the insert is positioned at one end of the pin;

FIG. 2 is an enlarged end elevation of the pin assembly as seen along the line 2—2 of FIG. 1;

FIG. 3 is a side elevation of a pin assembly in which the insert extends over the major portion of the length of the pin;

FIG. 4 is an enlarged cross section taken as indicated by the line 4—4 of FIG. 3;

FIG. 5 is a side elevation of a pin assembly having inserts at both ends of the pin;

FIG. 6 is an enlarged transverse cross section taken as indicated by the line 6—6 of FIG. 5;

FIG. 7 is a side elevation of a pin assembly that is similar to the pin assembly shown in FIG. 5 but has three inserts on each end instead of two inserts;

FIG. 8 is an enlarged transverse section taken as indicated by the line 8—8 of FIG. 7;

FIG. 9 is a view partly in section and partly in side elevation showing how the pin assembly in FIGS. 3 and 4 may be used to interconnect two plate members;

FIG. 10 is an elevational view with parts broken away showing how the invention may be embodied in a pin assembly to serve as a pintle for a hinge;

FIG. 11 is a view partly in side elevation and partly in section showing how a pin assembly such as the pin assemblies shown in FIGS. 1, 3, 5 and 7 may be used as a dowel;

FIG. 12 is a view partly in side elevation and partly in section showing how a headed pin assembly may be used to interconnect two members for high temperature use;

FIG. 13 is a transverse section taken as indicated by the line 13—13 of FIG. 12;

FIG. 14 is an enlarged fragmentary sectional view showing an insert in the form of a spirally rolled sheet metal member; and FIG. 15 is a view partly in side elevation and partly in section showing how a headed pin assembly may be used with an insert having plastic memory to hold together two plate members.

FIGS. 1 and 2 show a metal pin 20 that is of uniform diameter and is formed with a chamfer 22 at each of its opposite ends. The pin has a longitudinal groove 24 in its periphery that extends a substantial distance along the pin. The groove is shown as extending to the end of the pin but need not do so. The groove may be formed by a milling cutter. An elongated insert 25 seats in the groove 24 and extends radially outwardly of the pin 20 beyond the outer circumference of the pin. Thus in effect the insert 24 locally increases the width or diameter of the pin. The pin 20 is illustrated as having only one insert-equipped groove but may have more.

It is contemplated that the insert 25 will be resiliently deformable. If the pin is to be used at ordinary temperatures the insert 25 may be made of a suitable plastic such as nylon. On the other hand, if the pin is to be used in a high temperature environment the insert may be made of metal. For example, the insert may be a hollow metal body with a thin resilient wall. An insert in the form of a metal tube may be used and the metal tube may be of longitudinally split construction. A thin-walled metal insert of rolled construction provides a high degree of resiliency that is useful in some installations.

The insert 25 may be anchored in the groove 24 in any suitable manner. Thus a plastic insert of a metal insert may be bonded in place by suitable cement or adhesive. A metal insert may be bonded in place by brazing or spot welding. In the preferred practice of the invention, however, the insert 25 merely seats frictionally in the groove 24. For this purpose the groove 24 is made deep enough to embrace the insert 25 across a diameter of the insert and the resilient insert is made slightly oversize relative to the width of the groove so that the insert is resiliently compressed by the groove with consequent effective frictional engagement of the insert by the opposite walls of the groove.

The pin 20 may be used for example, as a dowel in the manner illustrated by FIG. 11. FIG. 11 shows the pin 20 mounted in a blind bore 26 of a member 28. The blind bore 26 is, of course, larger in diameter than the diameter of the metal of the pin 20 to admit the pin but the diameter of the pin across the insert 25 and including the insert is greater than the diameter of the blind bore.

When the pin 20 with the insert 25 is forced into the blind bore 26 to the position shown in FIG. 11, the insert is resiliently compressed against the pin to create the desired frictional resistance to withdrawal of the pin from the blind bore. Part of the resistance to withdrawal is provided by the pressure contact between the compressed insert and the adjacent wall of the blind bore. The remaining and substantial portion of the frictional resistance to withdrawal of the pin is created by the reaction thrust of the insert against the pin. The reaction thrust presses the pin forcibly against the wall of the blind bore in the region that is diametrically opposite from the location of the insert.

FIG. 3 shows a pin 30 with a longitudinal insert 32 of any of the described constructions seated in a longitudinal groove 34. The pin 30 differs from the pin 20 only in the groove 34 extending the full length of the pin and the insert 32 extending nearly the full length. The pin has the usual chambers 22 at its opposite ends.

An example of the utility of the pin 30 is shown in FIG. 9 where the pin serves as a fastening means to interconnect two contiguous members 35 and 36. The two members 35 and 36 have aligned bores 37 and 38 respectively which are of the same diameter. The two bores 37 and 38 are dimensioned for snug sliding fit with the pin 30 and the combined width of the pin and the insert 32 is greater than the diameter of the two bores 37 and 38 to create the desired frictional resistance to withdrawal, as discussed above. The pin 30 is illustrated as having only a single longitudinal groove 34 with a single insert 32 but may be provided with any number of longitudinal grooves with corresponding inserts.

FIGS. 5 and 6 show a pin 40 which is like the first described pin 20 but is provided with two inserts at each end. Thus the pin 40 has a diametrically opposite pair of grooves 24 at one end and a second diametrically opposite pair of grooves 24 at its other end with an insert 25 of any of the previously described constructions seated in each of the four grooves. The pin 40 may be employed in various ways for various purposes. For example the pin 40 may be substituted for the pin 30 in FIG. 9.

The pin 50 in FIG. 7 and FIG. 8 differs from the pin 40 only in having three grooves 24 in each of its opposite ends. The three grooves 24 may be at equal circumferential space as shown in FIG. 8. The pin 50 may obviously be used in various ways. For example the pin 50 may be substituted for the pin 30 in FIG. 9.

FIG. 10 shows how a pin 60 fabricated in accord with the invention may serve as a hinge pin or a pintle in combination with two hinge plates 62 and 64 of a butt hinge. The huge plate 62 is notched, cut and rolled to form three cylindrical portions 65 and the hinge plate 64 is similarly formed with two cylindrical portions 66 that alternate with the cylindrical portions 65.

The hinge pin 60 is formed with three longitudinal grooves 68 which seat corresponding inserts 69 of any of the types heretofore described. The three inserts 69 lie inside the three cylindrical portions 65 respectively of the hinge plate 62 and thus create frictional engagement between the hinge pin and the hinge plate 62. The inserts 69 resist longitudinal movement of the hinge pin relative to the hinge plate 62 and, of course, also tend to resist rotation of the hinge pin relative to the hinge plate 62. There is, however, full freedom for rotation of the hinge plate 64 relative to the hinge pin 60 since none of the inserts make contact with the two cylindrical portions 66 of the hinge plate 64.

FIGS. 12 and 13 show the invention embodied in a pin 70 that is formed with a head 72 and a shank 74, the pin having the general configuration of a rivet. The pin 70 is shown as installed to anchor a thin plate 75 to a thicker plate 76. For this purpose the thin plate 75 is formed with a circular aperture 78 and the thicker plate 76 is formed with a blind bore 80. The aperture 78 and the blind bore 80 are dimensioned for snug sliding fit with the shank 74 of the pin.

The shank 74 is formed with a longitudinal groove 82 that extends from the leading end of the shank over the major length of the shank. The groove 82 seats a longitudinal insert 84. The combined width of the insert 84 and the shank 74 is greater than the diameters of the aperture 78 and the blind bore 80 so that the insert creates frictional engagement of the pin with both the thin member 75 and the thicker member 76.

The insert 84 may be of any of the various constructions heretofore discussed. In this instance, as may be seen in FIG. 13, the insert 84 is in the form of a thin-walled metal tube. The tube may be made, for example, of thin stainless steel and the tube may be cut lengthwise to form a sheet metal insert of split construction with a longitudinal gap 85. Such an insert has a spring-like resiliency and may be dimensioned to be resiliently compressed by the opposite side walls of the groove 82.

FIG. 14 shows how the longitudinal groove 86 of a pin 88 may seat and confine an insert 90 in the form of a helically rolled thin sheet of resilient metal. Such an insert may be highly resilient.

FIG. 15 shows a pin 90 with a shank 92 and a conical head 94. The pin 90 is shown as installed to hold together a pair of plate members 95 and 96, the two plate members having aligned bores 97 and 98, respectively. Both of the bores 97 and 98 are of the same diameter and are dimensioned for snug sliding fit with the pin shank 92.

The conical head 94 seats in a conical countersink 100 at the outer end of the bore 97 and the leading end of the shank 92 extends beyond the outer side of the second plate member 96. The shank 92 has a longitudinal groove 102 with a plastic insert 104 seated in the groove. The plastic employed for the insert 104 has a plastic memory and for this purpose the insert may be made of nylon. It is to be noted that the insert 104 extends over the major portion of the length of the shank 92 and thus extends beyond the outer face 105 of the second plate member 96.

When the pin assembly 90 is forced through the two bores 97 and 98 to the assembled position shown in FIG. 15, the laterally protruding insert 104 is compressed against the shank 92 and is thus deformed out of its original molded configuration. Because of the inherent plastic memory, the insert tends to return to its original configuration. The unrestrained end portion of the installed insert that lies beyond the face 105 is free to return to its original cross-sectional configuration. Consequently the outer end portion of the insert 104 develops an enlargement after the pin is installed and, as may be seen in FIG. 15, the enlargement forms a shoulder 106 that engages the outer face 105 in a positive manner. It is apparent that this shoulder 106 cooperates with the shoulder 108 of the head 94 to clamp the two plate member 95 and 96 together in a positive manner.

We claim:

1. Means to fit into two aligned uniform bores of a given diameter in two respective contiguous members for solely frictional engagement with the two members to interconnect the two members, comprising:
- a substantially rigid, headless, smooth pin of uniform diameter dimensioned in diameter to slide into the two bores, the opposite ends of the pin being chamfered, said pin having at least one longitudinal groove extending the length of said pin and cutting into both of the chamfers; and
- an elongated resiliently deformable insert seated in said groove longitudinally thereof and extending outwardly radially of the pin beyond the circumference of the pin, the overall cross dimension of the pin and the insert material being greater than the diameter of the two bores prior to the installation of the pin in the two bores whereby forcing the pin into the two bores resiliently deforms the insert to create frictional resistance to withdrawal of the pin from the two bores, said insert being at least as long as the diameter of the pin and resiliently contractible in width both radially of the pin and tangentially of the pin,
- the unrestrained dimension of the insert across the width of the groove being greater than the width of the groove whereby the groove compresses the insert to frictionally retain the insert when the pin is transported and handled prior to the installation of the pin,
- the two ends of the insert terminating short of the two ends of the pin to facilitate insertion of the pin into the two bores.

2. Means to fit into two aligned uniform bores of a given diameter in two respective continguous members for solely frictional engagement with the two members to interconnect the two members, comprising:
- a substantially rigid, headless, smooth pin of uniform diameter dimensioned in diameter to slide into the two bores, the opposite ends of the pin being chamfered, said pin being formed with a chamfer at each of its two opposite ends and having at each of its two opposite ends a longitudinal groove extending through the chamfer of each corresponding end of substantially less than the full length of the pin, each of said grooves being at least as long as the diameter of the pin; and
- elongated resiliently deformable inserts seated in said grooves respectively longitudinally thereof and extending outwardly radially of the pin beyond the circumference of the pin, each of the inserts being at least as long as the diameter of the pin, the overall cross dimension of the pin and the insert material in the region of each of the grooves being greater than the given diameter of the two bores prior to the installation of the pin in the bores whereby forcing the pin into the bores resiliently deforms the inserts at the opposite ends of the pin to create frictional resistance to withdrawal of the pin from the bores,
- each of said inserts being resiliently contractible in width both in its cross dimension radially of the pin and its cross dimension tangentially of the pin,
- the outer ends of said inserts terminating short of the corresponding ends of the pin to facilitate the insertion of the pin into the two bores.

References Cited by the Examiner

UNITED STATES PATENTS

| 349,004 | 9/1886 | Renshaw | 85—5.2 |
| 961,249 | 6/1910 | Meeker | 151—7 |
| 2,847,238 | 8/1958 | Bolling | 85—8.3 |
| 2,913,031 | 11/1959 | McKay et al. | 151—7 |
| 2,947,024 | 8/1960 | Czudak | 16—168 |
| 2,968,880 | 1/1961 | Petersen | 85—8.3 |
| 2,976,345 | 3/1961 | Whitted | 174—153 |

FOREIGN PATENTS 964,862  2/1950  France.

CARL W. TOMLIN, *Primary Examiner.*

EDWARD C. ALLEN, *Examiner.*